United States Patent
Benyoub et al.

(10) Patent No.: US 7,057,595 B1
(45) Date of Patent: Jun. 6, 2006

(54) IMAGE BINARIZATION METHOD

(75) Inventors: Belkacem Benyoub, Palaiseau (FR); Hicham El Bernoussi, Paris (FR)

(73) Assignee: Solystic, Gentilly Cedex (FR)

( * ) Notice: Subject to any disclaimer, the term of this patent is extended or adjusted under 35 U.S.C. 154(b) by 640 days.

(21) Appl. No.: 10/018,041

(22) PCT Filed: Jun. 14, 2000

(86) PCT No.: PCT/EP00/05468

§ 371 (c)(1),
(2), (4) Date: Apr. 15, 2002

(87) PCT Pub. No.: WO00/77718

PCT Pub. Date: Dec. 21, 2000

(30) Foreign Application Priority Data

Jun. 15, 1999 (FR) .................................. 99 07545

(51) Int. Cl.
*G09G 3/36* (2006.01)

(52) U.S. Cl. ...................... 345/89; 345/690; 345/77; 382/237

(58) Field of Classification Search ........ 345/690–698, 345/89, 77, 87; 382/237, 172, 270; 358/456; 706/20, 48
See application file for complete search history.

(56) References Cited

U.S. PATENT DOCUMENTS 5,815,606 A * 9/1998 Baker et al. ................. 382/237
6,236,466 B1 * 5/2001 Chung ......................... 358/1.9
6,269,353 B1 * 7/2001 Sethi et al. ................... 706/20

FOREIGN PATENT DOCUMENTS

EP 0 467 577 A2 * 9/1991
WO WO 97/34253 * 2/1997

* cited by examiner

*Primary Examiner*—Regina Liang
*Assistant Examiner*—Jennifer T. Nguyen
(74) *Attorney, Agent, or Firm*—Pitney Hardin LLP

(57) ABSTRACT

The method for transforming a digital image (A) having several gray levels into a binary image (F) in which each pixel is coded over one bit, consists in applying, to each current pixel (P) of the digital image having several gray levels, several different parallel binarization processes (T1, T2, T3) each delivering as output a binary value for this current pixel and in combining (T4) the binary values delivered by the various binarization processes for each current pixel of the digital image having several gray levels so as to obtain a resultant binary value constituting the corresponding pixel of the binary image.

2 Claims, 2 Drawing Sheets

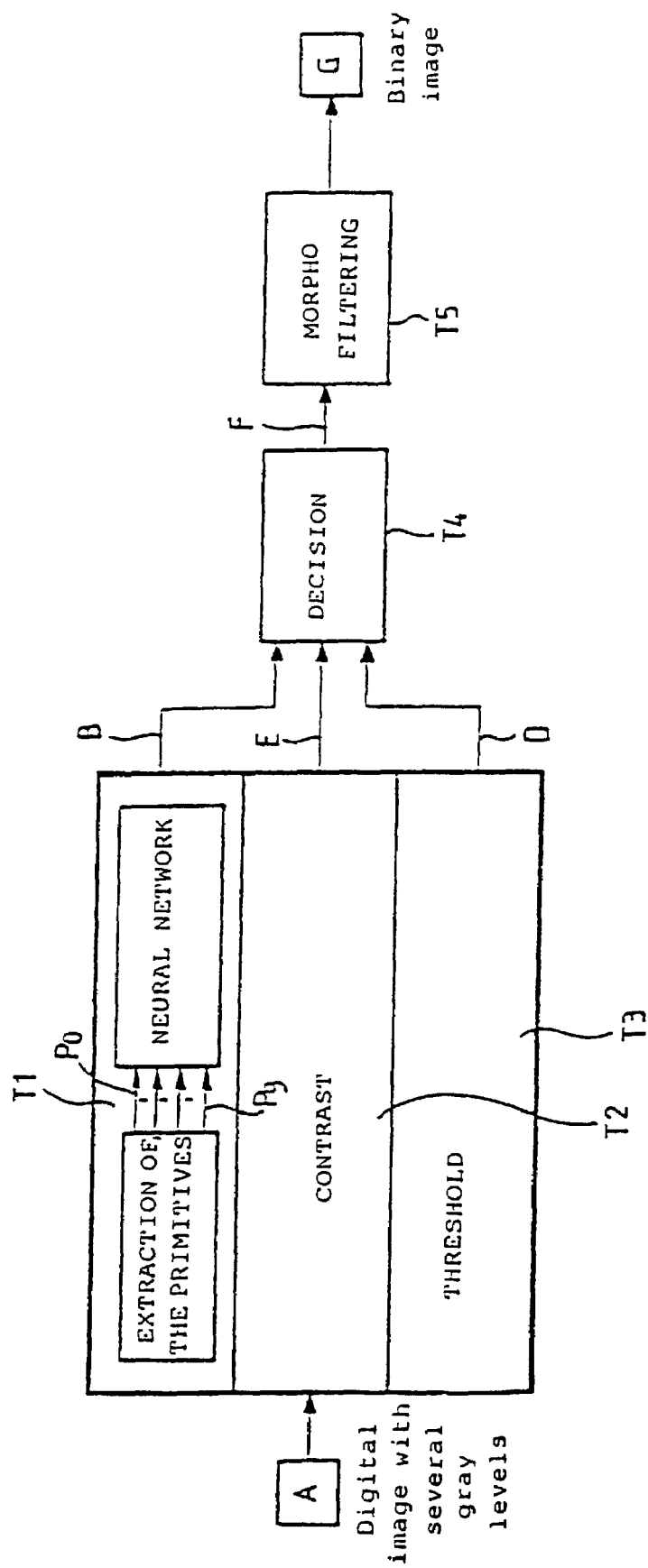
FIG_1

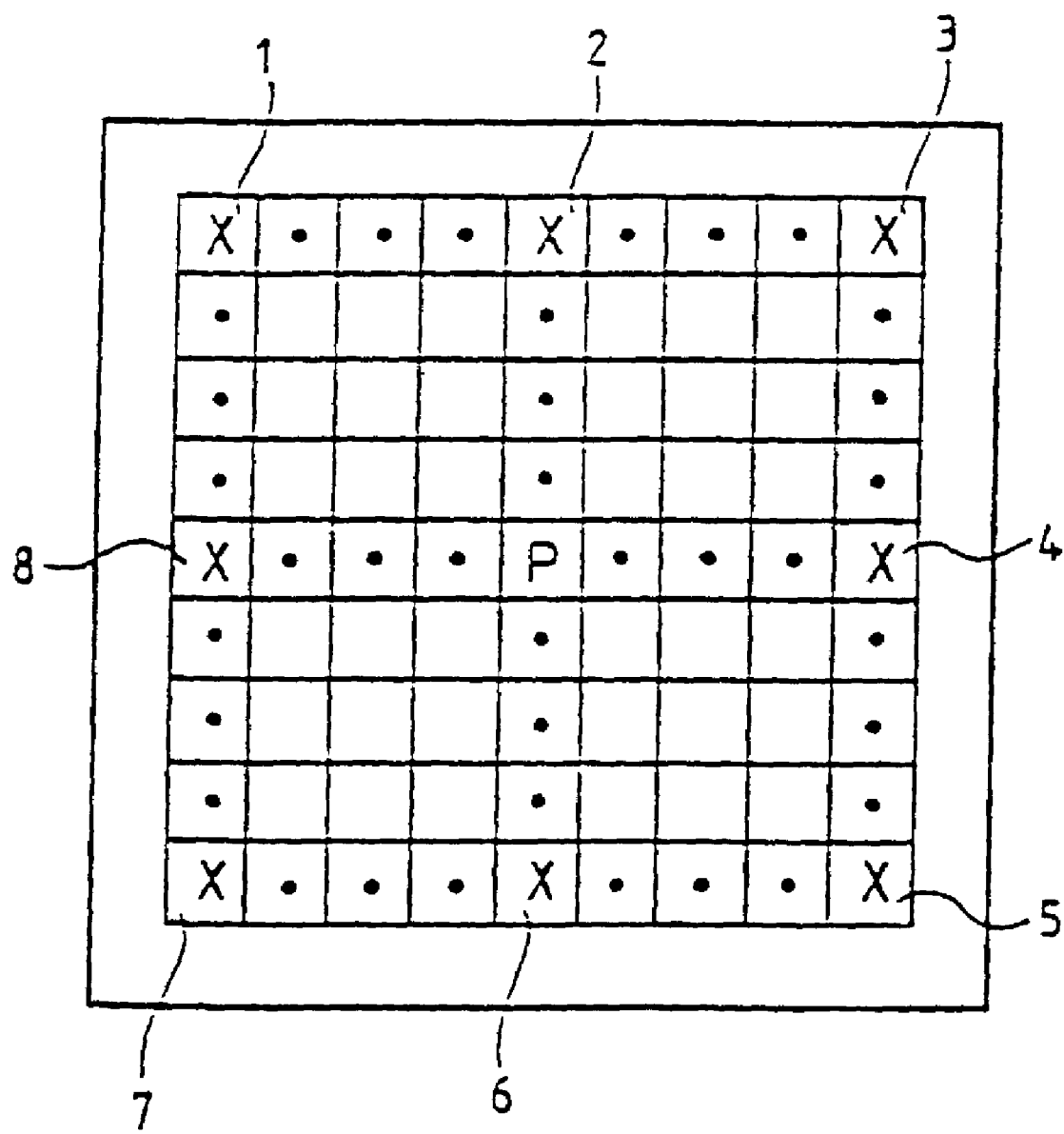

IMAGE BINARIZATION METHOD

BACKGROUND OF THE INVENTION

1. Field of the Invention

The invention relates to a method of transforming a digital image having several gray levels into a binary image in which each pixel is coded over one bit. It applies most particularly to automatic mail processing machines. In the automatic processing of mail, it is usual to provide a camera between the unit for taking mail items from the stack and the unit for sorting these mail items, this camera producing a digital image with several gray levels of the face of each mail item on which the destination address of the mail is printed. This digital image having several gray levels is used to carry out automatic recognition of the characters of the address and subsequently automatic reading of the address so as to operate the downstream sorting unit.

2. Description of the Prior Art

The automatic character recognition processes are applied to binarized images, that is to say images in which each pixel is coded over a single bit. In the digital image with several gray levels, each pixel is generally coded over one byte, that is to say over eight bits.

Hitherto, to transform a digital image having several gray levels into a binary image, the mail processing sector has made use of processing by dynamic thresholding consisting in calculating, for each pixel of the digital image having several gray levels, the local contrast level within a certain neighborhood of this pixel, this contrast level making it possible to calculate a local threshold with which the gray level of the pixel is compared for the coding of the corresponding pixel in the binary image. For example, if the gray level of the current pixel is less than or equal to the local contrast level of this pixel, the corresponding pixel of the binary image is white and in the converse case it is black. The binary image therefore comprises only black or white pixels. There are other processes for binarizing a digital image having several gray levels, for example the static thresholding process according to which the gray level of each pixel of the image to be binarized is compared with a fixed threshold or else processes using operators such as the gradient, the Laplacian, the standard deviation, etc.

Within the postal mail sector, the characters printed on the mail items exhibit great variability which is due to the local practices of each country as regards the printing of addresses on mail items as well as to the use of different printing supports. It follows that by applying the same binarization process to a wide spectrum of mail items, a great diversity is obtained in the quality of the binary images. The latter do not always retain the original geometrical structure or the connectedness of the characters of the images having several gray levels. The interconnecting of the characters, when they are very close together, and their sinkage, when they are abnormally thick are not always taken into account in the binary images. Likewise, the weak contrasts which may constitute elements characteristic of the shape of the characters are not always recovered within the binary image whereas smudges on the character printing support may be recovered within the binary image.

The aim of the invention is therefore to propose a method for transforming a digital image having several gray levels into a binary image which remedies the drawbacks indicated above.

SUMMARY OF THE INVENTION

To this end, the subject of the invention is a method for transforming a digital image having several gray levels into a binary image in which each pixel is coded over one bit, which consists in applying, to each current pixel of the digital image having several gray levels, several different parallel binarization processes each delivering as output a binary value for this current pixel and in combining the binary values delivered by the various binarization processes for each current pixel of the digital image having several gray levels so as to obtain a resultant binary value constituting the corresponding pixel of the binary image.

This multiprocess approach allows the best account to be taken of the diversity of printing of the characters in the digital images having several gray levels of mail items. The combining of the binary values at the output of the binarization processes makes it possible to adapt the definitive coding of the pixel in the binary image as a function of the specific characteristics of the mail items to be processed.

The binarization processes can include bandpass processes of dynamic or static thresholding type, high-pass processes with the aid of computational operators of the differential type (gradient, Laplacian) and low-pass processes with the aid of computational operators of the integrator type.

According to a particular feature of the method according to the invention, these binarization processes can in part be carried out by a neural classifier. For each pixel of the digital image to be binarized, the neural classifier is supplied with a vector of values characterizing the environment of this pixel in this image and on the basis of this vector of characteristic values, the neural classifier produces a binary value for this pixel. The use of a neural classifier is particularly advantageous for processing very different spectra of mail items on one and the same machine. This is because it is sufficient to carry out learning phases for training the neural classifier on batches of mail items exhibiting the particular features of the diverse spectra of mail so as to construct so many sets of neuron weights for the neural classifier. By holding these various sets of neuron weights in memory in the automatic mail processing machine, it is possible easily to adapt the binarization procedure to mail items of a certain type by loading the set of neuron weights which best suits mail items of this type.

BRIEF DESCRIPTION OF THE DRAWINGS

The method according to the invention and its implementation are described in greater detail hereinbelow and illustrated in the drawings.

FIG. 1 depicts a schematic diagram of the method according to the invention.

FIG. 2 illustrates a window of 9×9 pixels of a digital image having several gray levels.

DETAILED DESCRIPTION OF THE PREFERRED EMBODIMENT

The method for transforming a digital image having several gray levels into a binary image according to the invention is therefore more particularly intended to be implemented in an automatic mail processing machine.

Hereinbelow, a digital image having several gray levels will be regarded as being an image produced as a square grid of pixels with a specified density of pixels per millimeter, for example 8 pixels per millimeter in both directions. Each pixel of this image is for example coded over 8 bits and therefore with a total dynamic range of 256 gray levels.

FIG. 1, the transformation of a digital image having several gray levels A into a binary image F is therefore achieved according to the method of the invention by the parallel application of several different binarization processes such as T1, T2, T3, performed in pipeline mode on the image A. Each binarization process delivers as output a binary intermediate image and the pixels of the binary images B, E, D respectively produced by the processes T1, T2 and T3 are combined in a decisive process T4 so as to obtain a resultant binary image F whose pixels are exclusively white or black.

An additional morphological filtering process T5 can advantageously be applied to the image F to produce an image G of better quality than the image F. In particular, this process T5 can make it possible to eliminate the white pixels or the black pixels from the image F both within the background and within the outline as well as from the boundaries between these two categories of pixel of the image.

Generally, each binarization process such as T1, T2 and T3 is an iterative process which is applied to all the pixels of the image A and we shall denote by P the current pixel of the image A which is being processed in the course of an iteration of a binarization process.

The binarization processes which can be paralleled are of the bandpass, high-pass or low-pass type. The binarization processes illustrated by FIG. 1 are the static thresholding process such as T3 or the local contrast process by dynamic thresholding such as T2 which are two bandpass type processes. In the static thresholding process, the gray level of the current pixel is simply compared with a fixed threshold so as to assign the value 0 or 1, corresponding for example to a white pixel or a black pixel respectively, to the corresponding pixel in the binary image D. The principle of dynamic thresholding has already been set forth above.

The principle of the method according to the invention is to obtain, for each pixel of the image A, several binary values 1 or 0 produced in parallel by so many different binarization processes, that is to say the corresponding pixels of the images B, E, D, and to combine these binary values 1 or 0 so as to code the corresponding pixel of the binary image F to 1 or 0. It will be understood that this combining of the binary values makes it possible to favor this or that binarization process as a function of the type of mail items to be processed to obtain the resultant binary image F. This combining could also be based on the principle of majority voting.

In the method according to the invention, certain of the parallel binarization processes can be carried out by a neural classifier. As may be seen in particular in FIG. 1, the output of the process T1 is the output of a neural classifier. To simplify the subsequent description, the expression neighborhood of a current pixel P in the image A will refer to a square matrix of pixels at the center of which the current pixel P is located. FIG. 2 illustrates a neighborhood of the pixel P consisting of a square matrix of 9×9 pixels such as pixels 1 to 8.

The neural classifier can be of the MLP type (Multi Layer Perception) with one or more hidden layers. The principle of operation of this neural classifier is to translate into a binary value, a vector of data characterizing the environment of a current pixel P of the image A. By way of example, this neural classifier can have an input layer with 10 neurons to which are applied 10 data characteristic of a current pixel P which were extracted by computational primitives P0 to P9 detailed hereinbelow by way of non-limiting example.

The primitive P0 simply extracts the gray level of the current pixel P. This datum corresponds to one of the 256 gray levels and is coded on one byte.

The primitives P1, P2 and P3 respectively compute the average gray levels about the pixel P for different neighborhoods thereof in the image A, typically in matrices of 3×3 pixels, of 7×7 pixels and of 13×13 pixels.

The primitives P4 and P5 respectively compute the maximum deviation of the gray levels of the pixels in different neighborhoods of a pixel P in the image A, typically in matrices of 7×7 pixels and of 13×13 pixels.

The primitives P6 and P7 compute the standard deviation of the gray levels of the pixels in different neighborhoods of the pixel P, typically in square matrices of 7×7 pixels and of 13×13 pixels.

The primitive P8 computes the local contrast level in a neighborhood of the pixel P, typically a matrix of 13×13 pixels. Here, this primitive corresponds in part to the binarization process T2.

Finally, the primitive P9 extracts the gradient over four directions in a neighborhood of the pixel P, typically a matrix of 3×3 pixels.

The weights of the neurons of the neural classifier are obtained by learning according to the method of backpropagation from synthesized binary images. These images are synthesized so as to orient the network of neurons in the direction desired; for example, to avoid sinking the thick characters, one uses a high proportion of synthesized images which represent thick characters; in the nominal case these images are in proportion representative of the actual mail. It is advantageous to carry out several learning phases so as to construct several sets of weights for the neurons of the classifier so that each set of weights is more particularly adapted to mail items to be processed of a certain type. The parallel processes T1, T2 and T3 can be implemented within an ASIC circuit and are all parametrizable. In the phase of use in a mail processing machine, various thresholding parameters of the processes T2 and T3, various computational parameters of the primitives P0 to P9 and various sets of weights of the neurons of the neural classifier of the process T1 can be held in memory in the automatic mail processing machine so that it is conceivable to be able to recover them selectively so as to parametrize the ASIC circuit before commencing a binarization procedure on a particular batch of mail items.

The invention claimed is:

1. A method for transforming a digital image of a mail item comprising an address information and having several gray levels into a binary image having pixels each coded by one bit, in order to automatically read the information address from said binary image, said method comprising the steps of:
    a) applying to each current pixel of said digital image several different parallel binarization processes; and
    b) combining, for each current pixel of the digital image, the binary values delivered by the different processes for obtaining a corresponding current pixel of the binary image,
    wherein one of said parallel binarization processes is a neural classifier having a set of weights for neurons learned from a backpropagation method onto synthesized images of mail items, said neural classifier translating a vector of data characterizing the environment of said current pixel in the digital image (A) into a binary value, and wherein said vector of data characterizing said environment of said current pixel in the digital image is based upon the gray level of the current pixel in the digital image, average gray levels around the current pixel for different neighborhoods thereof in the digital image, the maximum deviation of the gray levels of the pixels in different neighborhoods of the current pixel in the digital image, the standard deviation of the gray levels of the pixels in different neighborhoods of the current pixel in the digital image, the local contrast level in a neighborhood of the current pixel in the digital image, and the gradient over four directions in a neighborhood of the current pixel in the digital image.

2. A method as claimed in claim 1, wherein said neural classifier has undergone several learning phases by back-propagation in order to construct so many different sets of weights for the neurons of the neural classifier, these various sets of weights being held in memory in the automatic mail processing machine and in which these sets of weights can be selectively retrieved so as to binarize digitized images for a specified batch of a mail items.

* * * * *